(12) United States Patent
Baldwin et al.

(10) Patent No.: US 11,846,505 B2
(45) Date of Patent: Dec. 19, 2023

(54) ROTOR RUNOUT AND CONCENTRICITY JIG

(71) Applicants: Paul R. Baldwin, Perris, CA (US); Deanna R. Preciado, Perris, CA (US); Vincent A. Preciado, Perris, CA (US)

(72) Inventors: Paul R. Baldwin, Perris, CA (US); Deanna R. Preciado, Perris, CA (US); Vincent A. Preciado, Perris, CA (US)

( * ) Notice: Subject to any disclaimer, the term of this patent is extended or adjusted under 35 U.S.C. 154(b) by 704 days.

(21) Appl. No.: 17/064,818

(22) Filed: Oct. 7, 2020

(65) Prior Publication Data

US 2021/0131784 A1    May 6, 2021

Related U.S. Application Data

(60) Provisional application No. 62/929,353, filed on Nov. 1, 2019.

(51) Int. Cl.
*G01B 5/20* (2006.01)
*F16D 65/12* (2006.01)

(52) U.S. Cl.
CPC ............. *G01B 5/201* (2013.01); *F16D 65/12* (2013.01)

(58) Field of Classification Search
CPC .......... G01B 5/201; F16D 65/12; F16D 66/00
See application file for complete search history.

(56) References Cited

U.S. PATENT DOCUMENTS

| | | | |
|---|---|---|---|
| 3,564,240 A * | 2/1971 | Thomas, Jr. ...... | G01N 23/20025 378/81 |
| 4,180,915 A | 1/1980 | Lill | |
| 5,193,274 A | 3/1993 | Ball et al. | |
| 5,224,303 A | 7/1993 | Baldwin | |
| 5,615,589 A * | 4/1997 | Roach ...................... | B23B 5/02 82/146 |
| 5,918,707 A | 7/1999 | Saunders, III | |
| 5,931,050 A * | 8/1999 | Roach ...................... | B23B 5/02 74/571.1 |
| 6,601,485 B2 | 8/2003 | Baldwin et al. | |
| 6,895,841 B2 | 5/2005 | Newell et al. | |
| 7,134,811 B2 | 11/2006 | Francis et al. | |
| 8,307,561 B2 | 11/2012 | Inoue et al. | |
| 8,342,139 B2 | 1/2013 | Rockwell | |
| 11,454,486 B2 * | 9/2022 | Lawrence ............ | G01B 5/0025 |
| 2021/0131784 A1 * | 5/2021 | Baldwin ................ | G01B 5/201 |

FOREIGN PATENT DOCUMENTS

JP             2010032353 A  *  2/2010

* cited by examiner

*Primary Examiner* — Yaritza Guadalupe-McCall
(74) *Attorney, Agent, or Firm* — Kirk A. Buhler; Buhler & Associates Patenting

(57) ABSTRACT

Improvements in a rotor runout and concentricity jig that mimics the runout and/or concentricity of an axle of a vehicle that can be transferred to a rotor. The jig uses discs with high and low points and/or two eccentric tubes. The parts can be adjusted from in-phase to out of phase to duplicate the characteristics of the axle. The adjustments have incremental detents that correspond with the imperfections of the axle to rotor. The position of the rotor is marked on the axle and the rotor to ensure that the rotor is placed onto the axle in the exact same location. The axle and the rotor are cleaned, reinstalled and measured for runout and concentricity. The rotor is then removed and inaccuracies for runout and/or concentricity are transferred to the jig for machining the rotor.

20 Claims, 5 Drawing Sheets

ROTOR RUNOUT AND CONCENTRICITY JIG

CROSS REFERENCE TO RELATED APPLICATION

This application claims the benefit of Provisional Application Ser. No. 62/929,353 filed Nov. 1, 2019 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a jig that increases the accuracy of turning a brake rotor. More particularly, the present rotor runout and concentricity jig allows for compensating for runout and/or concentricity to machine a rotor that matches the characteristics of the vehicle.

Description of Related Art Including Information Disclosed Under 37 CFR 1.97 and 1.98

Over time the brake pads on a vehicle will abrade the rotor and cause the vehicle to shake, especially when the brakes are depressed. When needed or when the brakes are being replaced the rotor is turned to provide a flat surface so depressing the brakes does not cause a vibration. Previously the rotor was removed from the axle and machined on a lathe to remove runout. While this removed runout from the rotor, there was also runout and/or concentricity issued that were cause by the axle or the interface between the axle and the rotor. To combat this issue rotors are now required to be machined on the axle so any inaccuracies at the rotor are removed from the rotor where the brake is being applied. A number of patents and or publications have been made to address these issues. Exemplary examples of patents and or publication that try to address this/these problem(s) are identified and discussed below.

U.S. Pat. No. 5,193,274 issued on Mar. 16, 1993 to Richard C. Ball et al., and is titled Method and Apparatus for Manufacture of a Vehicle Wheel having Controlled Lateral Runout Characteristic. This patent discloses a method and apparatus for manufacture of a vehicle wheel rim and disc assembly with controlled lateral runout characteristics in which a preformed rim is fixtured and rotated while gauges measure lateral runout of the inboard and outboard rim bead seats. Phase angle and amplitude of the first harmonic of average lateral runout of the bead seats are determined, which effectively identify a rim plane of substantially zero first harmonic of bead seat lateral runout. While this patent is for manufacturing a vehicle wheel it does not address the brake rotor.

U.S. Pat. No. 5,615,589 issued on Apr. 1, 1997 to James A. Roach and is titled Apparatus for Runout Compensation. This patent discloses a runout compensator is provided that angulates a face surface by adjusting two members whose mating surfaces have been machined to slant relative to the central axis of each member. A first member has a shaft over which slides the second member so that the mating surfaces of each member come into and are maintained in contact. Rotating the second member about the shaft of the first member varies the angulation of a face surface. Correctly adjusting the runout compensator, which is attached to a lathe, and a load plate assembly providing biasing to hold the workpiece between itself and the runout compensator, allows the workpiece to be firmly held in the angled position needed to compensate for the runout in the workpiece as the workpiece is turned upon a lathe. This patent requires the shaft to be concentric and runout to be determined on the identified by the second member on the brake disc.

U.S. Pat. No. 8,307,561 issued on Nov. 13, 2012 to Shigeru Inoue and is titled Jig and Method for Measuring Runout of Flange Surface of Hub Unit. This patent discloses a jig for measuring a runout of a flange surface of a hub unit adapted to be fitted between a plurality of plate-shaped projecting portions of a road wheel mounting flange of a deformed type including the plurality of plate-shaped projecting portions. The projecting portions are formed on an outer circumferential surface of a hub wheel serving as a rotating side member of a road wheel hub unit so as to project radially. While this patent is for measuring runout of a flanged surface it does not address machining a brake disc.

What is needed is a jig that can be adjusted based upon the measured runout and/or concentricity and the rotor is mounted with the jig to mimic the runout and/or concentricity found at the spindle. The rotor runout and concentricity jig disclosed in this document provides the solution.

BRIEF SUMMARY OF THE INVENTION

It is an object of the rotor runout and concentricity jig to accommodate the runout in a rotor. Runout is the difference of perpendicularity of a rotor relative to the axis of rotation. The adjustment is by two disks that have high and low thickness that can be moved in-phase, out of phase or to locations in-between. The spindle can have some inherent runout.

It is an object of the rotor runout and concentricity jig to accommodate the concentricity of a rotor. Concentricity is the difference between the expected center of rotation and the center of rotational center of an object. The adjustment is by two eccentric tubes that have high and low thickness that can be moved in-phase, out-of-phase or to locations in-between. The spindle can have some inherent runout.

It is an object of the rotor runout and concentricity jig for the runout adjustment to accommodate runout in increments of between zero and 0.020 of an inch. The runout is measured at the axle and can then adjusted at the jig to offset the runout found in the spindle of the vehicle.

It is an object of the rotor runout and concentricity jig for the concentricity adjustment to accommodate runout in increments of between zero and 0.020 of an inch. The concentricity is measured at the spindle and can then adjusted at the jig to offset the concentricity found in the axle of the vehicle.

It is another object of the rotor runout and concentricity jig to be dis-assembleable for cleaning. Upon use of the jig, machining particles can migrate between parts of the jig. Separating the parts gives the technician the ability to separate the parts, clean and re-assemble the parts to eliminate introduction of debris that can cause runout and concentricity issues that are not intended.

It is another object of the rotor runout and concentricity jig to have detents for finite adjustments. The detents both provide a positive feedback for incremental adjustment and also provide positive stops to reduce accidental movement between the parts when the jig is being installed with the rotor on a spindle of a vehicle.

It is still another object of the rotor runout and concentricity jig to mimic runout and/or concentricity that is induced by the spindle. The position of the rotor is marked on the axle and the rotor to ensure that the rotor is placed onto the axle in the exact same location. The axle and the rotor are cleaned, reinstalled and measured for runout and concentricity. The rotor is then removed and inaccuracies for runout and/or concentricity are transferred to the jig. The jig and rotor can then be placed into a lathe to mimic the specific characteristics of the axle/rotor so the rotor can be machined.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 7 shows an alternate perspective of the rotor runout and concentricity jig.

DETAILED DESCRIPTION OF THE INVENTION

Figure 1:
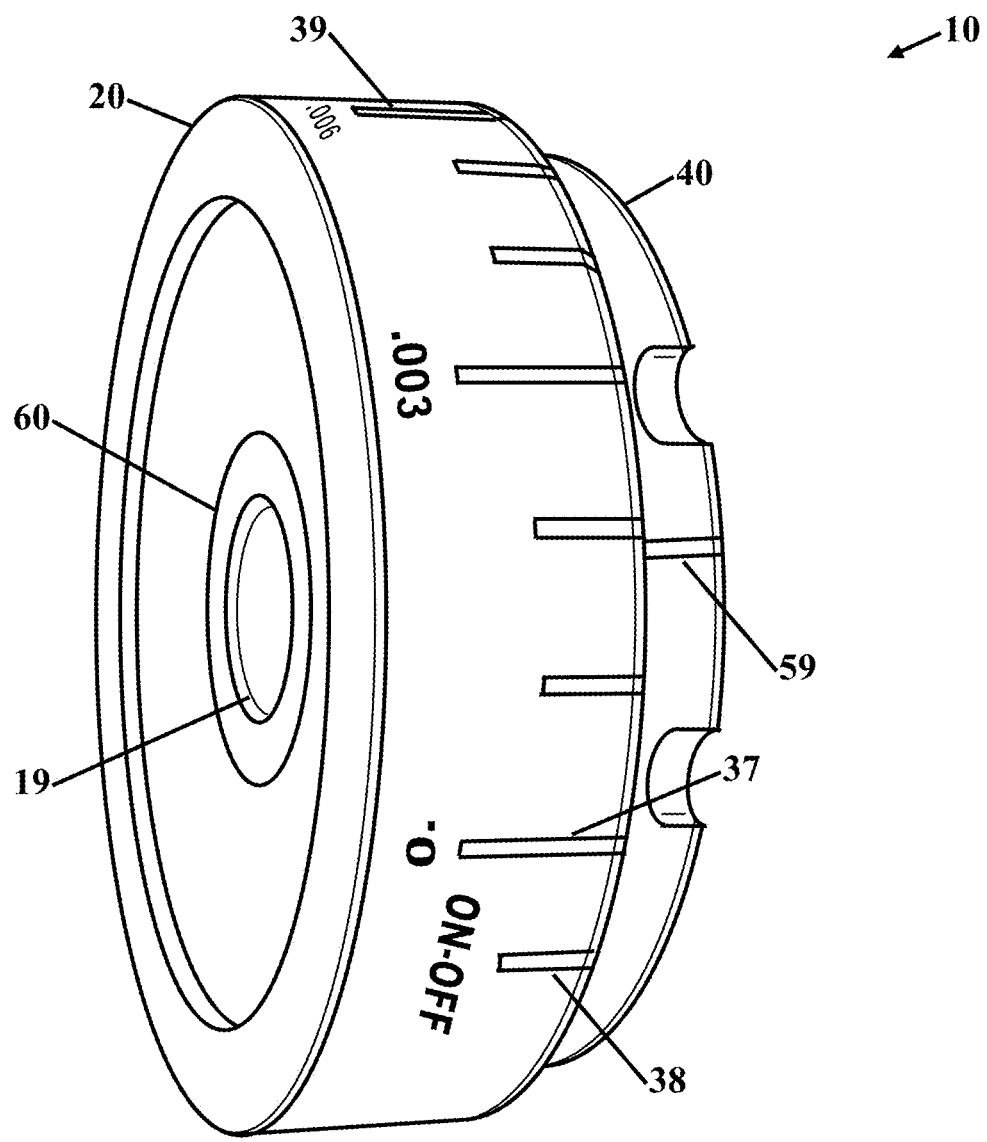
FIG. 1 shows a perspective view of the rotor runout and concentricity jig.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description | |
| --- | --- |
| 10 rotor runout and concentricity jig | 15 axis |
| 16 hub | 17 stud |
| 18 rotor | 19 inner bore |
| 20 outer ring | 21 slot(s) |
| 22 arc recess | 23 detents |
| 24 recess | 25 track |
| 26 recess | 34 major indicia |
| 35 minor indicia | 36 0.001 |
| 37 "0" indicia | 38 on-off indicia |
| 39 runout indicia | 40 inner ring |
| 41 grip | 42 spring-loaded ball(s) |
| 43 spring-loaded ball | 44 pin |
| 45 inside face | 46 lip |
| 59 inner ring indicia | |
| 60 central ring | 61 concentricity zero |
| 62 concentricity indicia | 91 eccentric |
| 92 mark | 93 dial indicator |
| 94 dial indicator | 95 mark |
| 96 mark | 97 concentricity |
| 98 runout | 99 pulled |

FIG. 1 shows a perspective view of the rotor runout and concentricity jig 10. While this figure shows the rotor runout and concentricity jig 10 with both the runout rings and the concentricity ring, it should be understood that the rotor runout and concentricity jig 10 can be constructed and used to provide just runout or just concentricity adjustments. Other figures in this document provides the description of runout and concentricity and how these different anomalies in are measure from a spindle to a rotor. In a brief description of the rotor runout and concentricity jig 10 there is an outer ring 20 that has runout indicia 39. The runout indicia provide measurements from the rotor of a vehicle (not shown). The runout measurement is taken when a rotor of a vehicle is mounted on a vehicle. The exact position of the rotor is identified to ensure that the runout can be determined from the rotational position of the rotor. The runout indicia 39 can be set based upon the measurement of the rotor.

In this embodiment the runout is from 0.000 to 0.020 and more preferably 0.000 and 0.012 of an inch in 0.001 increments, while this particular measurement and increments are shown and described in this embodiment, the increments can be greater or lesser and can be in metric measurements. An inner ring indicator 59 is aligned with the runout indicia 39 shown on the outer ring to match the runout measure from the rotor. To match a zero runout there is a "0" indicia 37. To remove the inner ring 40 from the outer ring 20, the inner ring indicia 59 is aligned with the on-off indicia 38 and the inner ring 40 can be withdrawn from the outer ring 20 when the rings are clocked to the on-off position.

Concentricity is adjusted with the interface between the central ring 60 and the outer ring 20. The inner bore 19 is shown for the axis of rotation. The concentricity is a different measurement from the runout, and while a rotor can turn with a variation in concentricity the concentricity adjustment ensures that any variation in the concentricity of the rotor is accommodated by the rotor runout and concentricity jig 10 to accurately machine a rotor.

Figure 2:
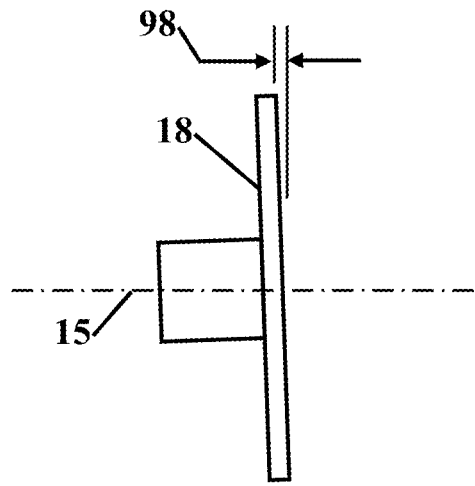
FIG. 2 shows a description of runout.
Figure 3:
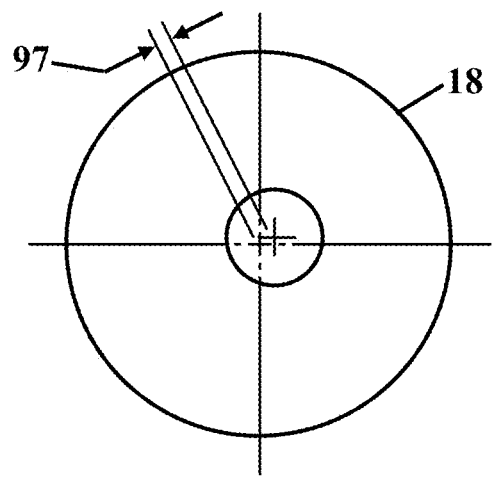
FIG. 3 shows a description of concentricity.
Figure 4:
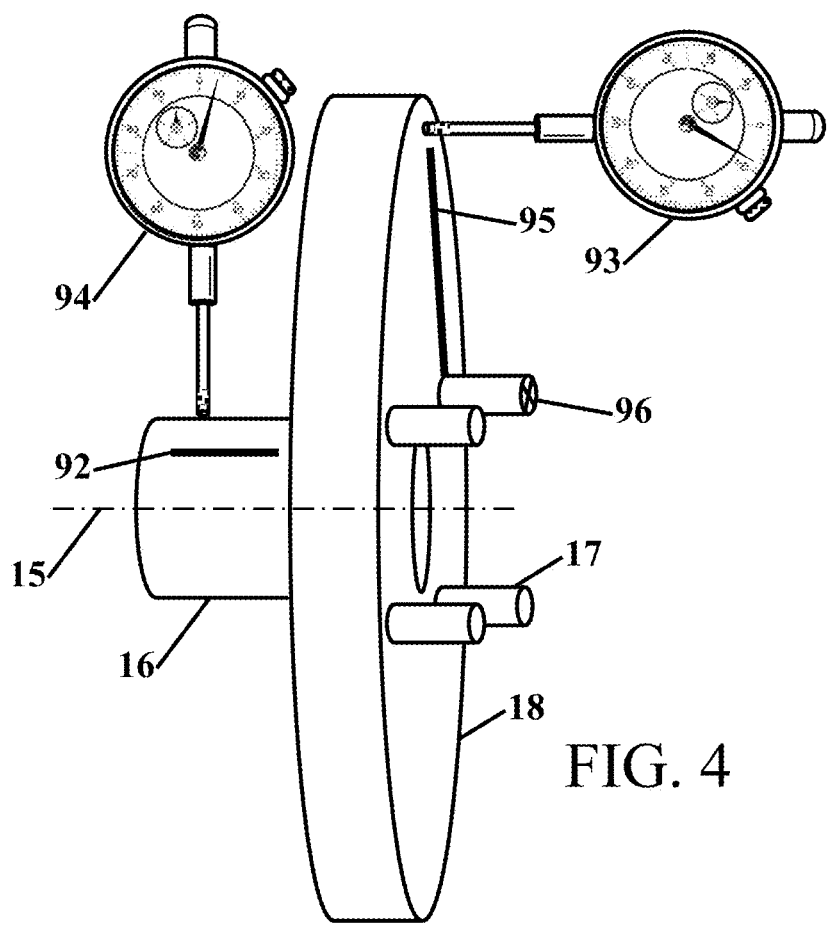
FIG. 4 shows measurement and transferring the runout and concentricity from a rotor and spindle of a vehicle

Prior to using the rotor runout and concentricity jig the runout and/or concentricity must be determined. The runout and concentricity are different features that can exist separately on a rotor and spindle. Each does not generally affect the other. To understand these features, FIG. 2 shows a description of runout 98 on a rotor 18 on an axis 15 of rotation, FIG. 3 shows a description of concentricity 98 on a rotor 18 and FIG. 4 shows measurement and transferring the runout and concentricity from a rotor and spindle of a vehicle that can be set into the rotor runout and concentricity jig. Prior to taking these measurements, the faces and mating surfaces of the spindle and rotor are cleaned to remove rust, dust or other contaminants that can cause inaccurate measurements. The intent of the measurements is to mimic inaccuracies found in the spindle and rotor. If the rotor is turned on the spindle of the vehicle, while on the vehicle, the inaccuracies are present in the resulting turning of the rotor.

While the high measurement locations for each feature usually exist at a different location on a spindle/rotor, a user will mark 95 the high spot from the dial indicator 93 for the runout and mark 92 the high reading from the concentricity dial indicator 94. A mark 96 is also placed on a bolt 96 for reference. The marks ensure that the orientation is maintained. The runout 98 can be taken from one or both sides of the rotor face and usually at an outer location where a brake pad as eroded some of the rotor. The concentricity 97 can be taken from a variety of locations including the inside or outside of a hub 16 or an outer diameter of the rotor 18.

Figure 5:
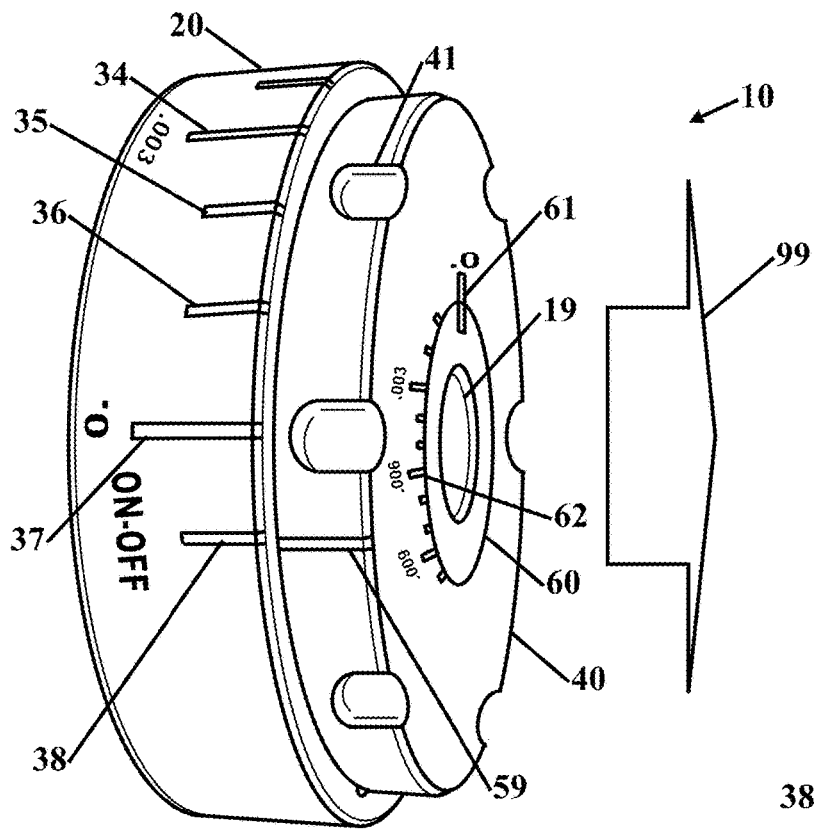
FIG. 5 shows a perspective view of a dis-assembled the rotor runout and concentricity jig.
Figure 6:
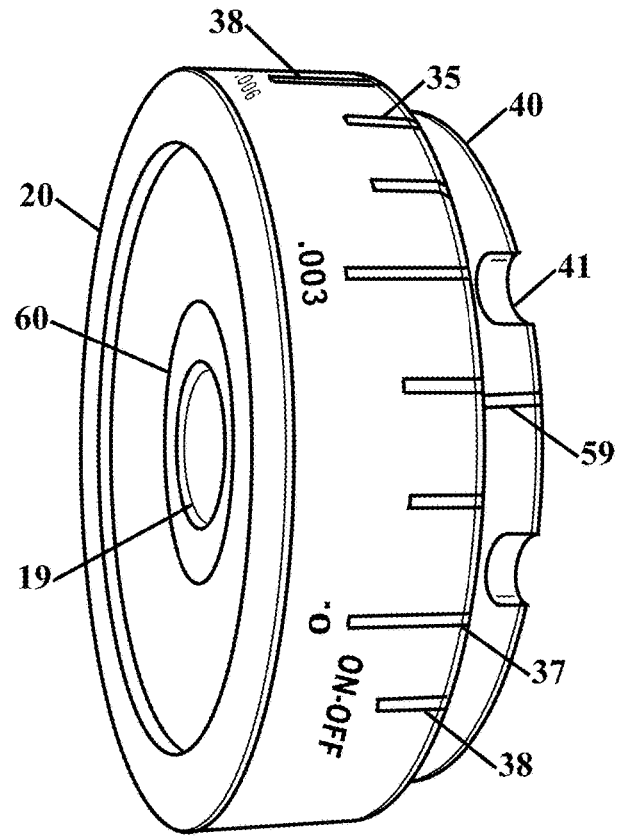
FIG. 6 shows an alternate perspective of the rotor runout and concentricity jig from FIG. 5.

FIG. 5 shows a perspective view of a dis-assembled the rotor runout and concentricity jig 10 and FIG. 6 shows an alternate perspective of the rotor runout and concentricity jig from FIG. 5. In the basic runout unit, there is an outer ring 20 and an inner ring 40. The rings are rotated to alter the runout that is created by the rotor runout and concentricity jig 10. The runout can be adjusted in 0.001—inch increments, but can be other increments including metric. It is also contemplated that both metric and English increments can be marked on the rotor runout and concentricity jig 10.

The outer ring 20 shows a "0" indicia 37 for zero runout. There are minor 0.001 36 minor indicia 35 with major indicia 34 every 0.003 inch of runout on the outer ring 20. There is also an on-off indicia 38 for separating the outer ring 20 from the inner ring 40. Upon use of the jig, machining particles can migrate between parts of the jig. Separating the parts gives the technician the ability to separate the parts, clean and re-assemble the parts to eliminate introduction of debris that can cause runout and concentricity issues that are not intended. In FIG. 6 the inner ring indicia 59 is aligned for 0.002 runout. In FIG. 5 an inner ring indicium 59 is aligned for separation of the outer ring 20 from the inner ring 40. When the indicia are aligned for On-Off, the outer ring 20 can be pulled to separate it from the inner ring 40. The inner ring 40 has a plurality of grip 41 or finger wells that allows a user to more easily grip the inner ring 40 and rotate the inner ring 40 relative to the outer ring 20 to make adjustments for runout.

For concentricity there is an adjustment between the inner ring 40 and the central ring 60. The inner ring 40 and the central ring 60 can be rotated so the inner bore 19 is concentric or eccentric. There are indicia 62 that aligns with the zero indicia marker 61 to center the inner bore 19 or to offset the center bore 19 from the middle and outer ring 20.

Figure 7:
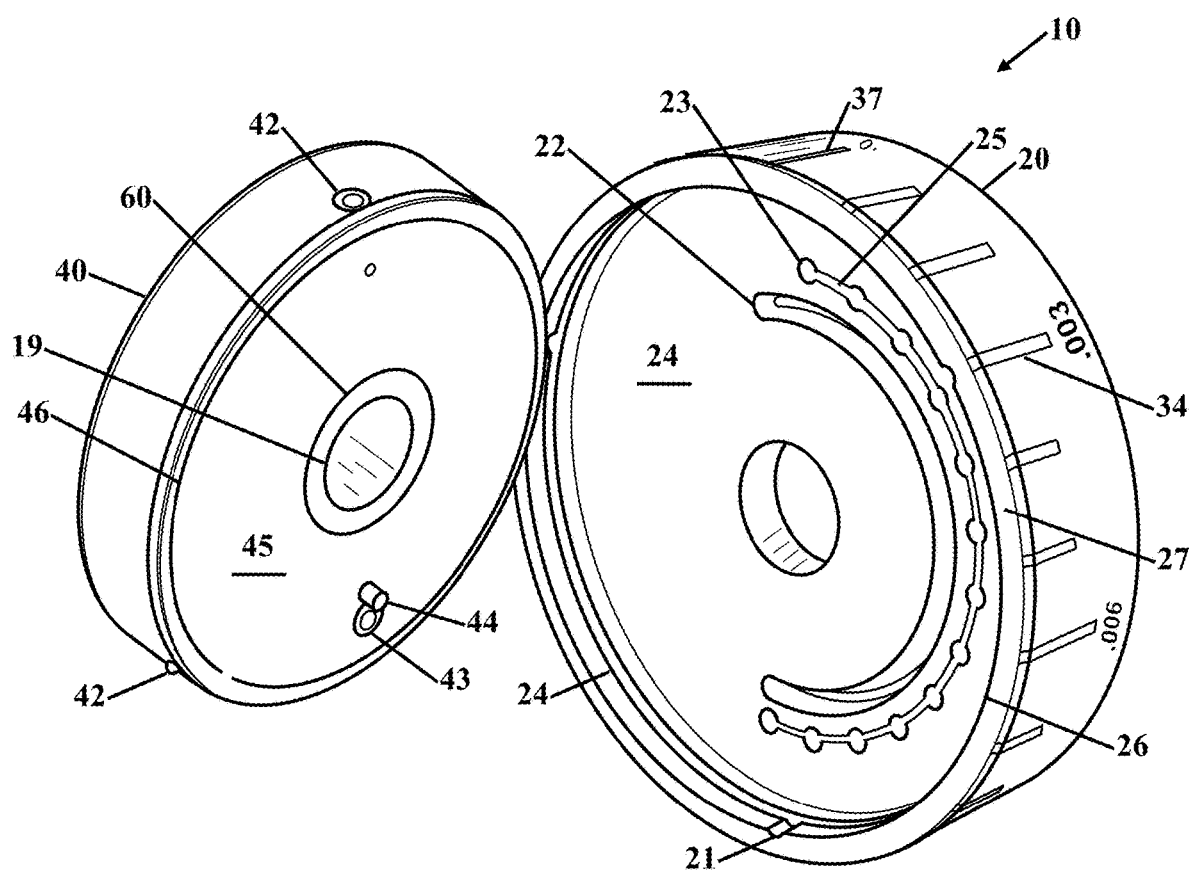
FIG. 7 shows a perspective view of a dis-assembled the rotor runout and concentricity jig.

FIG. 7 shows a perspective view of a dis-assembled the rotor runout and concentricity jig 10. The central ring 60 with the inner bore 19 is shown within the inner ring 40. The outside diameter of the inner ring 40 is sized to fit within the recess 26 in the outer ring 20. On the outer diameter of the inner ring 40 are a plurality of spring-loaded ball(s) 42. The spring-loaded balls fit through the slots(s) 21 in the recess 26 in the outer ring 20 when the inner ring indicator (not shown) on the inner ring 40 aligns with the on-off indicia on the outer ring 20. The slot(s) 21 extend to the outer face 27 of the outer ring 20. The slots(s) provide a clearance for the plurality of spring-loaded ball(s) to pass through the slot(s) 21.

The plurality of outer spring-loaded balls 42 can or are placed at uneven increments around the inner ring 40 whereby the inner ring 40 is configured to fit into said outer ring 40 in only one position. The runout is machined into the outer faces of the inner ring 40 and the face of the recess 24 of the outer ring 20. A machinist can use just a single disc to have a fixed of runout. There is a lip 46 on the inside face 45 that provides some clearance for dirt and debris.

Starting with the inner ring 40, the inner portion of the inner ring 40 shows a pin 44 that fits with the arc recess 22 in the outer ring 20. The pin 44 tracks within the arc recess 22 that limits the travel of the inner ring 40 relative to the outer ring 20. The arc recess 22 is about 180 degrees of rotation or clocking. A rotation beyond 180 degrees would decrease the runout. While the recess 22 allows for 180 degrees of rotation the recess 22 could be 45, 90, 120 degrees or other degrees or rotation less than 180 degrees of rotation of the inner ring 40 within the outer ring. Adjacent to the pin 44 is a spring-loaded ball 43. The spring-loaded ball 43 engages into a track 25. The track 25 has a plurality of detents 23 that provides stops and positive feedback that the finite detents 23 correspond to the major indicia 34, minor indicia or the "0" indicia 37.

Figure 8A:
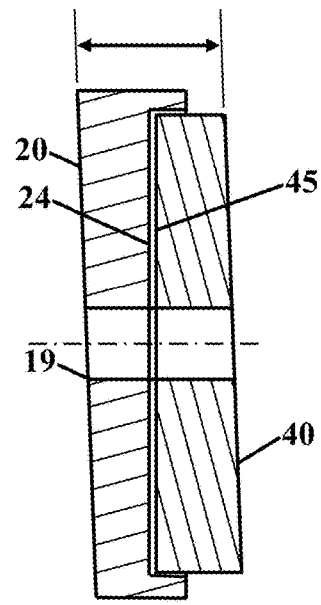
FIG. 8A shows a cross-section of the outer ring and the inner ring set to zero runout.
Figure 8B:
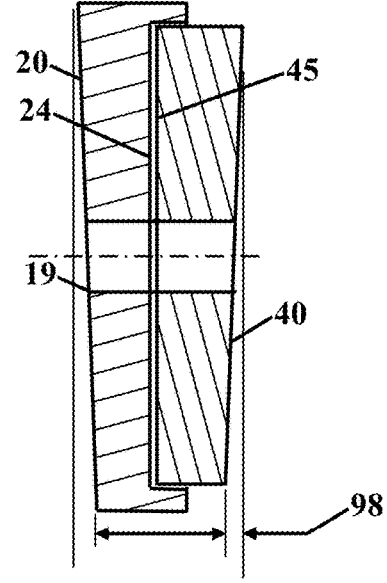
FIG. 8B shows a cross-section of the outer ring and the inner ring set for maximum runout.

FIG. 8A shows a cross-section of the outer ring 20 and the inner ring 40 set to zero runout and FIG. 8B shows a cross-section of the outer ring 20 and the inner ring 40 set for maximum runout. In these figures the runout 98 has been shown in an exaggerated condition for presentation. There is a slight angular variation between the inside face 45 of the inner ring 40 and the face of the recess 24 in the outer ring 20. The actual runout is 0.012, but could be formed to a greater or lesser amount depending upon design requirements.

Figure 9:
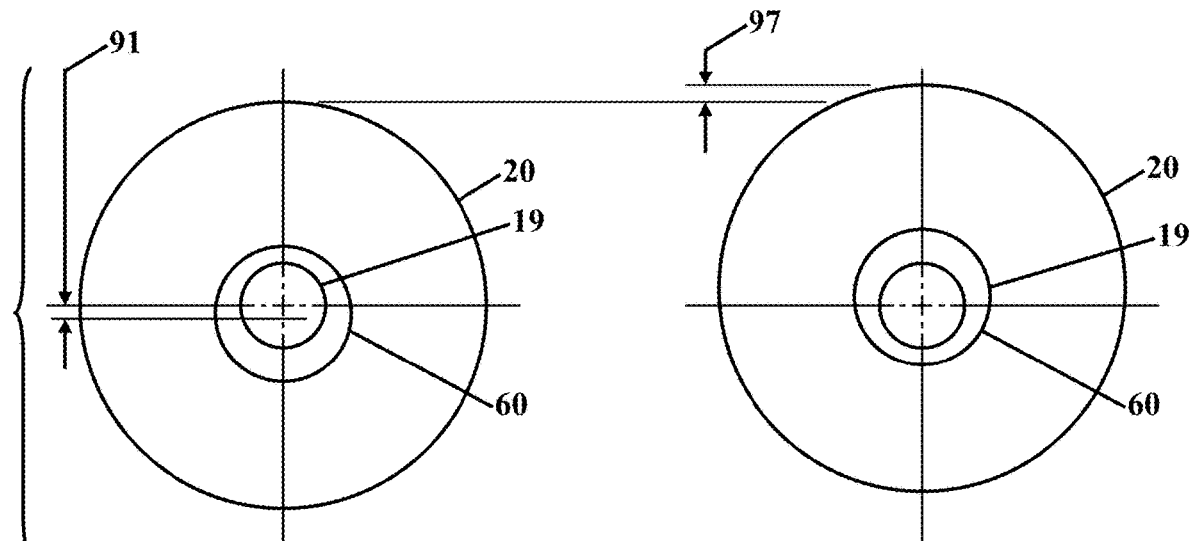
FIG. 9 shows the outer ring with no concentricity from the inner bore in the left image and with maximum concentricity of the outer ring to the inner bore in the right image.

FIG. 9 shows the outer ring 20 with no concentricity from the inner bore 19 in the left image and with maximum concentricity of the outer ring 20 to the inner bore 19 in the right image. The interface between the outer ring 20 and the central ring 60 is eccentric 91 and can be positioned so the inner bore 19 is centered in the outer ring 20, as shown in the left image, or can be rotated to the maximum concentricity 97 shown in the left image or to any incremental variation therein between.

While the figures and description show the parts machined to create the runout and/or concentricity, it should be understood that the runout and/or concentricity could also be created using shims, sticker or spacers to create the variation on runout and/or concentricity to mimic the spindle to rotor interface.

It is also contemplated to design one of the rings with an integrated spring or cone to produce a pressure on the rotor when it is being machined.

Thus, specific embodiments of a rotor runout and concentricity jig have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A rotor runout and concentricity jig comprising:
   an outer ring having an outer face;
   at least one inner ring having a center of rotation;
   said outer ring and said at least one inner ring having mating faces wherein said mating faces are formed to produce an adjustable variation of runout between said center of rotation and said outer face;

said outer ring and said inner ring having indicia that corresponds to said runout, and said jig further includes a concentricity adjustment.

2. The rotor runout and concentricity jig according to claim 1, wherein said outer ring or said inner ring has detents that are indexed with a spring-loaded ball that indicate finite runout increments.

3. The rotor runout and concentricity jig according to claim 1, wherein said concentric adjustment is a central inner ring that is configured to fit within said inner ring.

4. The rotor runout and concentricity jig according to claim 3, wherein said central inner ring has an outside diameter that is eccentric to a hole in an inner bore of said inner ring.

5. The rotor runout and concentricity jig according to claim 4, wherein said inner ring has an eccentric hole that complements said eccentric outside diameter of said center ring.

6. The rotor runout and concentricity jig according to claim 1, wherein said concentric adjustment is between 0.000 and 0.020 inch.

7. The rotor runout and concentricity jig according to claim 1, wherein said inner ring is removable from said outer ring at a fixed clocked position.

8. The rotor runout and concentricity jig according to claim 1, wherein said at least one inner ring has a plurality of grip or finger wells.

9. The rotor runout and concentricity jig according to claim 1, wherein said indicia is on an outer circumference of said outer ring.

10. The rotor runout and concentricity jig according to claim 1, wherein said inner ring has an outside diameter that is configured to fit within a recess in said outer ring.

11. The rotor runout and concentricity jig according to claim 1, wherein said inner ring has a pin that is configured to track within an arc recess in said outer ring.

12. The rotor runout and concentricity jig according to claim 11, wherein said pin limits rotation of said inner ring within said outer ring.

13. The rotor runout and concentricity jig according to claim 12, wherein said rotation is limited to 180 degrees or less than 180 degrees.

14. The rotor runout and concentricity jig according to claim 1, wherein said inner ring has a plurality of outer spring-loaded balls that are located on an outside diameter.

15. The rotor runout and concentricity jig according to claim 14, wherein there are at least three of said plurality of outer spring-loaded balls.

16. The rotor runout and concentricity jig according to claim 15, wherein said plurality of outer spring-loaded balls are placed at uneven increments around said inner ring whereby said inner ring is configured to fit into said outer ring in only one position.

17. The rotor runout and concentricity jig according to claim 15, wherein said plurality of outer spring-loaded balls is configured to track within a recess in a recess in said outer ring.

18. The rotor runout and concentricity jig according to claim 17, wherein said recess in said outer ring has a plurality of slots that extend from said recess to an outer face of said outer ring.

19. The rotor runout and concentricity jig according to claim 18, wherein said plurality of slots allows said plurality of outer spring-loaded balls to pass into and out of said recess.

20. A rotor runout and concentricity jig comprising:

an outer ring having an outer face;

at least one inner ring having a center of rotation;

said outer ring and said at least one inner ring having mating faces wherein said mating faces are formed to produce an adjustable variation of runout between said center of rotation and said outer face;

said outer ring and said inner ring having indicia that corresponds to said runout, and said inner ring has a plurality of outer spring-loaded balls that are located on an outside diameter.

* * * * *